(12) United States Patent
Akami et al.

(10) Patent No.: US 6,375,688 B1
(45) Date of Patent: Apr. 23, 2002

(54) METHOD OF MAKING SOLID ELECTROLYTE CAPACITOR HAVING HIGH CAPACITANCE

(75) Inventors: Kenji Akami, Atsugi; Yasuo Kudo, Yokohama; Yasue Matsuya, Sagamihara; Hiroki Kusayanagi, Kawasaki, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/390,708

(22) Filed: Sep. 7, 1999

(30) Foreign Application Priority Data

Sep. 29, 1998 (JP) .......................................... 10-274954
Apr. 14, 1999 (JP) .......................................... 11-106271

(51) Int. Cl.$^7$ .............................. H01G 9/00; B05D 5/12; H01M 8/10
(52) U.S. Cl. ...................... 29/25.03; 361/523; 427/80; 429/30
(58) Field of Search .................. 29/250.03, 25.01, 29/25.02; 361/523–524, 530, 529; 427/79, 80; 429/30–33, 192

(56) References Cited

U.S. PATENT DOCUMENTS 4,910,645 A    3/1990   Jonas et al. ................... 361/525
5,461,537 A  * 10/1995  Kobayashi et al. .......... 361/525
5,914,852 A  *  6/1999  Hatanaka et al. ............ 361/523
6,191,013 B1 *  2/2001  Hahn et al. ................... 438/523

FOREIGN PATENT DOCUMENTS

| JP | 2-15611 | 1/1990 |
| JP | 6-325984 | 11/1994 |
| JP | 9-293639 | 11/1997 |
| JP | 2001-85275 | * 3/2001 |

* cited by examiner

*Primary Examiner*—Ha Tran Nguyen
(74) *Attorney, Agent, or Firm*—Parkhurst & Wendel, L.L.P

(57) ABSTRACT

The invention includes the steps of preparing a mixed solution containing a polymerizable monomer, an oxidant, and a solvent; immersing a capacitor element in the mixed solution; and heating the capacitor element immediately over the boiling point of the solvent, after taking out the capacitor element from the mixed solution, in order to evaporate the solvent and form a conductive polymer layer on the capacitor element; the heating is carried out at a rate capable of generating a force able to tear open the conductive polymer. This method provides a capacitor having a high capacitance attainment ratio, an excellent dissipation factor, and a superior impedance characteristic.

15 Claims, 4 Drawing Sheets

METHOD OF MAKING SOLID ELECTROLYTE CAPACITOR HAVING HIGH CAPACITANCE

FIELD OF THE INVENTION

The present invention relates to a manufacturing method of capacitor composed of a conductive polymer, having a small size and a large capacitance.

BACKGROUND OF THE INVENTION

As electronic appliances are digitized recently, there is an increasing demand for capacitors having a small size and a large capacitance, and having a low impedance in a high frequency region.

Hitherto, using a conductive polymer having a high electric conductivity as the electrolyte for the capacitor, many capacitors having a low impedance in a high frequency region have been proposed.

It is proposed to compose a capacitor having a constitution in which a conductive polymer containing a skeletal structure in the repeating units of 3,4-ethylenedioxythiophene and p-toluene sulfonic acid anion as dopant is formed on aluminum having a dielectric film by chemical polymerization. Japanese Laid-open Patent No. 2-15611 proposes a manufacturing method of capacitor comprising a step of applying a solution of dissolving 3,4-ethylenedioxythiophene monomer and oxidant in a solvent, on an oxidized aluminum electrode, a step of removing the solvent at room temperature or by heating to form a conductive polymer layer by chemical polymerization reaction, and a step of washing away excessive oxidant from the conductive polymer layer by using water, and finally drying.

A report in collected papers at the 58th general meeting of Japan Society of Electrochemistry, pp. 251–252 (1991), presents a manufacturing method of film capacitor having a large capacitance, comprising a step of forming a dielectric made of electrodeposition polyimide thin film on an etched aluminum foil, and a step of forming an electrode by forming conductive polymer layers sequentially by chemical polymerization and electrolytic polymerization.

Japanese Laid-open Patent No. 9-293639 proposes a solid electrolytic capacitor having a constitution in which a capacitor element having an anode foil and a cathode foil wound through a separator made of glass paper is impregnated with a mixed solution containing 3,4-ethylenedioxythiophene and oxidant, and polyethylenedioxythiophene produced by polymerization reaction of monomer in the mixed solution permeating in the separator is held by the separator as an electrolyte layer.

Using ferric p-toluene sulfonate as oxidant, and ethylene glycol as solvent, a capacitor element impregnated with a mixed solution containing them is let stand at temperature of 25 to 100° C., and a conductive polymer layer composed of polyethylenedioxythiophene is generated by polymerization reaction. Consequently, the generated conductive polymer layer is washed by using water or organic solvent, and dried. Such manufacturing method of capacitor is disclosed.

Japanese Laid-open Patent No. 6-325984 proposes a manufacturing method of impregnating a capacitor element composed of tantalum sintered metal with a cooled mixed solution containing pyrrole monomer and oxidant, and then polymerizing in the air at 25° C.

However, in the case of the method of impregnating a capacitor element made of a sintered metal forming a dielectric layer with a cooled mixed solution containing polymerizable monomer and oxidant, and polymerizing at temperature less than the boiling point of the solvent, the solvent is evaporated from the voids of the surface of the sintered metal. Since the mixed solution is supplied more or less in the surface voids from the inside, the conductive polymer layer formed by polymerization reaction is collected near the surface. As the process of impregnation with mixed solution, polymerization and washing is repeated by few times (extremely once), the surface voids are clogged.

When surface voids are clogged, the following problems occur. If attempted to impregnate with the mixed solution, the mixed solution does not permeate into the inner part of the capacitor element. As the process is repeated more times, the conductive polymer film cannot be formed densely inside the capacitor element. Excessive oxidant cannot be removed by washing after forming the conductive polymer layer. Due to these problems, high capacitance attainment ratio and excellent capacitor characteristic cannot be obtained.

Or, in the case of polymerization reaction at temperature of less than the boiling point of the solvent, after impregnating a capacitor element having an anode foil and a cathode foil wound cylindrically through a separator with a cooled mixed solvent, the solvent is evaporated from open ends at both sides of the cylindrical form. Since the mixed solution is supplied more or less in the end portions from the inside, the conductive polymer layer formed by polymerization reaction is collected near the end surface. As the process of impregnation with mixed solution, polymerization and washing is repeated by few times (extremely once), the end surface is clogged. When the end is clogged, the following problems occur. If attempted to impregnate with the mixed solution, the mixed solution does not permeate into the inner part of the capacitor element. As the process is repeated more times, the conductive polymer film cannot be formed densely inside the capacitor element. Excessive oxidant cannot be removed by washing after forming the conductive polymer layer. Due to these problems, high capacitance attainment ratio and excellent capacitor characteristic cannot be obtained.

Besides, when the conductive polymer layer is used as electrolyte, a high electric strength property cannot be obtained.

Moreover, in order to improve the stability at high temperature and high humidity, it is required to remove the excessive oxidant in the conductive polymer layer by washing. After applying or impregnating with the mixed solution in the capacitor element, when the conductive polymer layer is formed by polymerization reaction at temperature of less than the boiling point of the solvent, the conductive polymer layer is likely to be swollen and peeled off at the time of washing by using ethanol or other organic solvent. If washed by using deionized water without using organic solvent, excessive oxidant cannot be removed. Accordingly, when exposed to high temperature and high humidity, decrease or loss of capacitance, and increase of impedance occur, and the characteristics tend to deteriorate.

In the case of a wound capacitor element, when the conductive polymer layer is formed by polymerization reaction at temperature of less than the boiling point of the solvent, the excessive oxidant cannot be removed by sufficient washing same as in the case above. Accordingly, when exposed to high. temperature and high humidity, decrease or loss of capacitance, and increase of impedance occur, and the characteristics tend to deteriorate.

It is hence an object of the invention to obtain a capacitor having a high capacitance attainment ratio, an excellent capacitor characteristic, and an excellent stability at high temperature and high humidity.

SUMMARY OF THE INVENTION

A first aspect of the invention presents a manufacturing method of capacitor comprising:

a step of preparing a mixed solution containing polymerizable monomer, oxidant, and solvent, a step of impregnating a capacitor element with the mixed solution, a step of heating the capacitor element impregnated with the mixed solution quickly to a temperature above the boiling point of the solvent, and a step of forming a conductive polymer layer on the capacitor element, by chemical polymerization reaction between the polymerizable monomer and the oxidant.

A second aspect of the invention presents a manufacturing method of capacitor comprising:

a step of preparing a mixed solution containing polymerizable monomer, oxidant, and solvent, a step of impregnating at least one side of a dielectric layer with the mixed solution, a step of heating the dielectric layer impregnated with the mixed solution quickly to a temperature above the boiling point of the solvent, and a step of forming a conductive polymer layer on the one side of the dielectric layer, by chemical polymerization reaction between the polymerizable monomer and the oxidant.

Preferably, the step of preparing the mixed solution containing the polymerizable monomer, the oxidant and the solvent is a step of preparing a cooled mixed solution.

Preferably, the capacitor element has a dielectric layer formed on a sintered metal.

Preferably, the capacitor element has a constitution in which an anode foil forming a dielectric layer and a cathode foil are wound through a separator.

Preferably, it further comprises a step of impregnating the conductive polymer layer with an electrolyte.

Preferably, the polymerizable monomer contains 3,4-ethylenedioxythiophene.

Preferably, the anode foil and the cathode foil have multiple penetration holes.

In the first constitution above, by heating quickly to exceed the boiling point of the solvent after impregnating the capacitor element with the mixed solution, the solvent is evaporated, the volume expands, and the solvent ejects from the voids of the sintered metal surface. Therefore, if the conductive polymer layer generated by polymerization reaction gathers near the surface of the sintered metal to block the voids temporarily, the conductive polymer layer generated provisionally is torn away by the ejecting force of the solvent. As a result, clogging of the voids of the sintered metal surface by conductive polymer film is prevented. Of if the conductive polymer layer generated by polymerization reaction gathers near the end surface of the wound capacitor element to block the end surface temporarily, the conductive polymer layer is torn away by the ejecting force of the solvent, and clogging of the end surface by conductive polymer film is prevented. Accordingly, by repetition of the process of impregnation with mixed solution, polymerization and washing, the conductive polymer layer can be formed densely in the capacitor element. By sufficient washing after forming the conductive polymer film, excessive oxidant can be removed. As a result, a capacitor having a high capacitance attainment ratio, an excellent dissipation factor, and a superior impedance characteristic is obtained.

Further, by impregnating the conductive polymer layer with electrolyte after forming the conductive polymer layer densely inside the capacitor element, the restoration capacity of defects of the dielectric layer can be enhanced. As a result, a capacitor having an excellent dielectric strength property is obtained.

Figure 1:
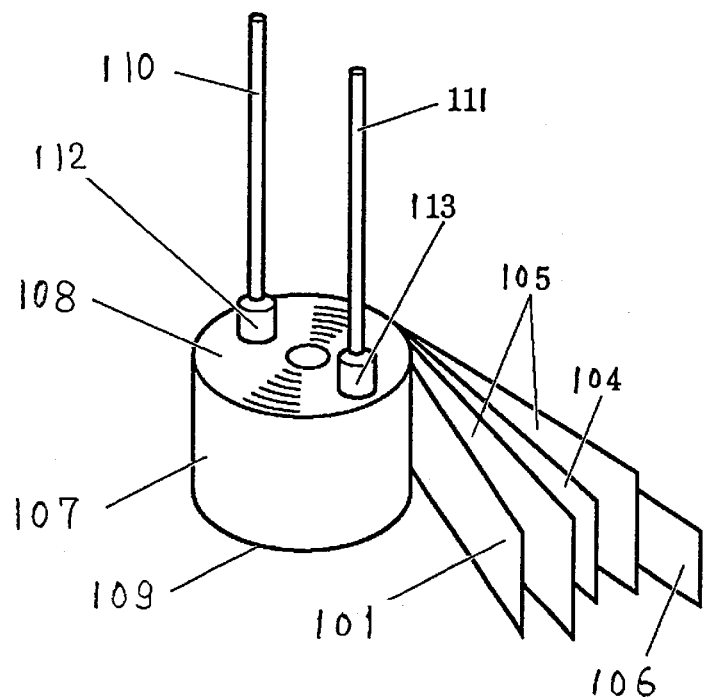
FIG. 1(*a*) is an outline view of a capacitor element in an embodiment of the invention, and FIG. 1(*b*) is its inside magnified view.
Figure 1:
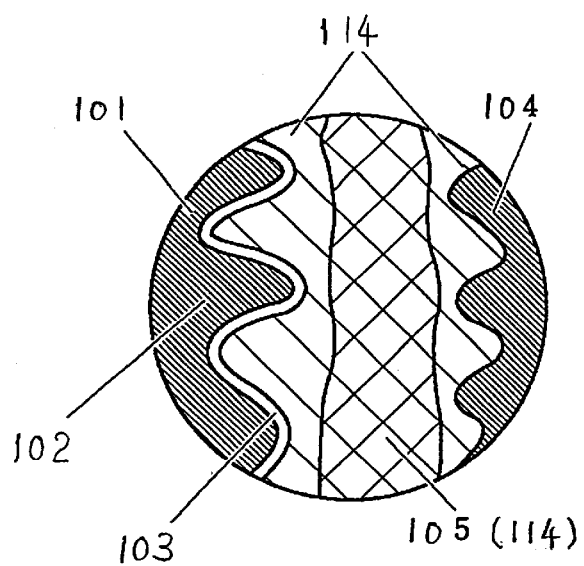

REFERENCE NUMERALS 11, 31, 101 Anode foil
1, 12, 102 Aluminum etched foil
2 Polyimide tape
3, 13, 103 Dielectric layer
14, 33, 104 Cathode foil
15, 35, 105 Separator
16, 36, 106 Winding tape
17, 37, 107 Capacitor element
18, 39, 108 End upper portion
19, 40, 109 End lower portion
5, 20, 110 Anode lead wire
6, 21, 111 Cathode lead wire
7 Cathode layer
112 Anode lead tab
113 Cathode lead tab
4, 22, 114 Conductive polymer layer
32, 34 Penetration hole
38 Side surface

DESCRIPTION OF THE PREFERRED EMBODIMENTS

According to an embodiment of the invention, a manufacturing method of capacitor comprises:

a step of cooling a polymerizable monomer solution having a polymerizable monomer and an oxidant solution containing an oxidant, a step of preparing a cooled mixed solution containing polymerizable monomer, oxidant, and solvent, a step of preparing a capacitor element forming a dielectric layer on a sintered metal, a step of impregnating the capacitor element with the mixed solution, a step of heating the capacitor element impregnated with the mixed solution quickly to a temperature above the boiling point of the solvent, and a step of forming a conductive polymer layer on the capacitor element, by chemical polymerization reaction between the polymerizable monomer and the oxidant.

The sintered metal has voids.

In this constitution, by heating quickly to exceed the boiling point of the solvent after impregnating the capacitor element with the mixed solution, the solvent is evaporated, expanded in the volume, and ejects from the voids of the sintered metal surface. Therefore, if the conductive polymer layer generated by polymerization reaction gathers near the surface to block the voids, the generated conductive polymer layer is torn away by the ejecting force. As a result, clogging of the voids of the sintered metal surface by the generated conductive polymer film is prevented. Accordingly, by repetition of the process of impregnation with mixed solution, polymerization and washing, the conductive polymer layer can be formed densely in the capacitor element. By sufficient washing after forming the conductive polymer film, excessive oxidant can be removed. As a result, a capacitor having a high capacitance attainment ratio, an excellent dissipation factor, and a superior impedance characteristic is obtained.

As the polymerizable monomer, thiophene, pyrrole, aniline, and their derivatives are preferably used.

As the solvent for the polymerizable monomer, water, methanol, ethanol, isopropanol, butanol, and their mixed solvents are preferably used. Without using solvent, alternatively, concentrate polymerizable monomer only may be also used.

Examples of oxidant include ferric alkylbenzene sulfonate, ferric naphthalene sulfonate, ferric alkyl naphthalene sulfonate, and ferric anthraquinone sulfonate, among others, and more preferably ferric naphthalene sulfonate is used.

As the solvent for oxidant solution, water (boiling point 100° C.), methanol (boiling point 64° C.), ethanol (boiling point 78° C.), isopropanol (boiling point 82° C.), butanol (boiling point 99° C.), or their mixed solvents may be used.

The step for heating quickly may be realized by a method of heating in an oven, or heating in contact with a hot-plate or the like.

The dielectric layer may be also an oxide film of a valve metal.

Other manufacturing method of capacitor of the invention comprises:

a step of cooling a polymerizable monomer solution and an oxidant solution, a step of preparing a cooled mixed solution containing polymerizable monomer, oxidant, and solvent, a step of preparing a capacitor element winding an anode foil forming a dielectric layer and a cathode foil through a separator, a step of impregnating the capacitor element with the mixed solution, a step of heating the capacitor element impregnated with the mixed solution quickly to a temperature above the boiling point of the solvent, and a step of forming a conductive polymer layer on the capacitor element, by chemical polymerization reaction between the polymerizable monomer and the oxidant.

In this constitution, by heating quickly to exceed the boiling point of the solvent after impregnating the capacitor element with the mixed solution, the solvent is evaporated and expanded in the volume, and the evaporated solvent ejects from the end surface through the gaps in the anode foil, separator and cathode foil. Therefore, if the conductive polymer layer generated by polymerization reaction gathers near the end surface to block the end temporarily, the generated conductive polymer layer is torn away by the ejecting solvent force. As a result, clogging of the end surface by the conductive polymer film is prevented. Besides, by repetition of the process of impregnation with mixed solution, polymerization and washing, the conductive polymer layer can be formed densely in the capacitor element. By sufficient washing after forming the conductive polymer film, excessive oxidant can be removed. As a result, a capacitor having a high capacitance attainment ratio, an excellent dissipation factor, and a superior impedance characteristic is obtained.

Herein, the cathode foil is composed by etching a valve metal such as aluminum foil, tantalum foil, niobium foil, or titanium foil. The anode foil has a dielectric layer formed on thus etched valve metal.

As the separator, Manila paper, kraft paper, synthetic fiber paper, glass paper or the like may be used.

A different manufacturing method of capacitor the invention comprises:

a step of preparing a mixed solution containing polymerizable monomer, oxidant, and solvent, a step of preparing a capacitor element winding an anode foil forming a dielectric layer and a cathode foil through a separator, a step of impregnating the dielectric layer with the mixed solution, a step of heating quickly to exceed the boiling point of the solvent, a step of forming a conductive polymer layer on the capacitor element, by chemical polymerization reaction between the polymerizable monomer and the oxidant, and a step of impregnating the conductive polymer layer with an electrolyte.

In this constitution, by impregnating the conductive polymer layer with electrolyte after forming the conductive polymer layer inside the capacitor element, the restoration capacity of defects of the dielectric layer can be enhanced. As a result, a capacitor having an excellent dielectric strength property is obtained.

Preferably, the dielectric layer is an oxide film of a valve metal.

Preferably, the dielectric layer is a polymer film.

Preferably, the polymer is a copolymer of polyimide or acrylic acid and methacrylic acid and styrene.

Preferably, the electrolyte is composed of γ-butyrolactone and phthalate.

In other embodiment of the invention, a manufacturing method of capacitor comprises:

a step of preparing a mixed solution dissolving 3,4-ethylenedioxythiophene monomer and oxidant in a solvent, a step of preparing a dielectric layer, a step of applying the mixed solution on at least one side of the dielectric layer, a step of heating the dielectric layer at the side coated with the mixed solution quickly to exceed the boiling point of the solvent, a step of forming a conductive polymer layer at least on one side of the dielectric layer by chemical polymerization reaction between the monomer and the oxidant, and a step of washing at least by using an organic solvent.

Right after application in the dielectric layer, the mixed solution is uniformly mixed. When starting polymerization reaction by letting stand at the temperature of less than the boiling point of the solvent, the solvent (partly monomer) is gradually evaporated, and the monomer and the oxidant are not mixed uniformly, and the oxidant deposits partly, thereby causing phase separation. Evaporation of solvent or monomer and polymerization reaction take place simultaneously, but as a result of phase separation, the degree of polymerization varies in the conductive polymer layer formed by polymerization reaction, and unreacted monomer and excessive oxidant are much left over. Accordingly, the conductive polymer layer is likely to be swollen in the organic solvent, and peeling tends to occur.

As in the constitution above, therefore, after application of mixed solution in the dielectric layer, by heating quickly to a temperature over the boiling point of the solvent, the solvent is evaporated rapidly, and the polymerization reaction is promoted in a uniformly mixed state of the monomer and oxidant. In this process, a conductive polymer layer of large molecular weight and uniform layer is obtained. In addition, the residue of unreacted monomer and excessive oxidant decreases.

As a result, when washing by using organic solvent, the generated conductive polymer is hardly swollen and is hence hardly peeled. Therefore, by washing sufficiently, unreacted monomer and excessive oxidant can be removed from the conductive polymer layer. As a result, a capacitor having an excellent stability in high temperature and high humidity state can be obtained.

Examples of oxidant include ferric alkylbenzene sulfonate, ferric naphthalene sulfonate, ferric alkyl naphthalene sulfonate, and ferric anthraquinone sulfonate, among others, and more preferably ferric naphthalene sulfonate is used.

As the solvent, water, methanol, ethanol, isopropanol, butanol, and others are used, and preferably ethanol is used.

The step for applying may be realized by brushing, immersion, dropping, spraying or the like, and immersion is particularly preferred.

The step for heating may be realized by a method of heating in an oven, or heating by an infrared ray lamp, and oven heating is preferred.

The organic solvent for washing is methanol, ethanol and others, and ethanol is particularly preferred.

In the capacitor of which dielectric layer is composed of an oxide film of a valve metal, the conductive polymer layer functions as the electrolyte serving also as the cathode. In the film capacitor of which dielectric layer is composed of a polymer film, the conductive polymer layer functions as a simple electrode.

As the dielectric layer, an oxide of a valve metal may be also used.

As the valve metal, aluminum may be used.

As the dielectric layer, a polymer film may be also sued.

As the polymer film, a polyimide film may be used.

In a different embodiment of the invention, a manufacturing method of capacitor comprises:

a step of preparing a mixed solution dissolving 3,4-ethylenedioxythiophene monomer and oxidant in a solvent, a step of preparing a capacitor element winding an anode foil and a cathode foil through a separator, a step of impregnating the capacitor element with the mixed solution, a step of heating quickly to exceed the boiling point of the solvent, a step of forming a conductive polymer layer in the capacitor element by chemical polymerization reaction between the monomer and the oxidant, and a step of washing at least by using an organic solvent.

In the case of polymerization reaction at temperature of less than the boiling point of the solvent, after impregnating a capacitor element having an anode foil and a cathode foil wound cylindrically through a separator with a mixed solvent, the solvent is evaporated from open ends at both sides of the cylindrical form. Since the mixed solution is supplied more or less in the end portions from the inside, the conductive polymer layer formed by polymerization reaction is collected near the end surface. As the process of impregnation with mixed solution, polymerization and washing is repeated by few times (extremely once), the end surface is clogged with the generated conductive polymer. When the end is clogged, if attempted to impregnate the capacitor element with the mixed solution, the mixed solution does not permeate into the inner part of the capacitor element, and as the process is repeated more times, the conductive polymer film cannot be formed densely inside the capacitor element.

Accordingly, by heating quickly to exceed the boiling point of the solvent after impregnating the capacitor element with the mixed solution, the solvent is evaporated and expanded in the volume, and ejects from the end surface through the gaps in the anode foil, separator and cathode foil. Therefore, if the conductive polymer layer generated by polymerization reaction gathers near the end surface to block the end, it is torn away by the ejecting force, and clogging of the end surface by the conductive polymer film is prevented. Therefore, by repetition of the process of impregnation with mixed solution, polymerization and washing, the conductive polymer layer can be formed densely in the capacitor element. As a result, a capacitor having a high capacitance attainment ratio is obtained.

Moreover, by heating quickly over the boiling point of the solvent, the solvent is evaporated rapidly, and the polymerization reaction proceeds with the monomer and oxidant mixed uniformly. In this process, a conductive polymer layer of large molecular weight and uniform layer is obtained. Besides, the unreacted monomer and excessive oxidant are decreased extremely as compared with the case of promoting polymerization reaction by letting stand at temperature below the boiling point of the solvent, and only a small amount of monomer and oxidant is left over. As a result, when washing by using organic solvent, the generated conductive polymer is hardly swollen and is hardly peeled. Hence, by sufficient washing, unreacted monomer and excessive oxidant can be removed. As a result, a capacitor having an excellent stability in high temperature and high humidity condition is obtained.

Herein, the cathode foil is composed by etching a valve metal such as aluminum foil, tantalum foil, niobium foil, or titanium foil. The anode foil is made of an anodic oxidized material of such etched valve metal.

As the separator, Manila paper, kraft paper, synthetic fiber paper, glass paper or the like may be used.

In the quick heating step, the capacitor element is heated in an oven.

Or, in the quick heating step, the capacitor element is heated on a hot-plate or the like.

In a further different embodiment of the invention, a manufacturing method of capacitor comprises:

a step of preparing a mixed solution dissolving 3,4-ethylenedioxythiophene monomer and oxidant in a solvent, a step of preparing an anode foil and a cathode foil having multiple penetration holes, a step of preparing a capacitor element winding the anode foil and the cathode foil through a separator, a step of impregnating the capacitor element with the mixed solution, a step of heating quickly to exceed the boiling point of the solvent, a step of forming a conductive polymer layer in the capacitor element by chemical polymerization reaction between the monomer and the oxidant, and a step of washing at least by using an organic solvent.

In the wound capacitor element, if the spacing of the end faces is wide and the capacitance is large, the organic solvent can hardly permeate into the inside of the capacitor element where the opened place is the end surface only, and sufficient washing is not possible.

Accordingly, by forming multiple penetration holes in the anode foil and cathode foil, the organic solvent can permeate not only from the end surface of the cylindrical capacitor element but also from the side surface. By washing sufficiently, therefore, unreacted monomer and excessive oxidant can be removed from the conductive polymer layer. As a result, a capacitor having an excellent stability in high temperature and high humidity condition is obtained.

Herein, penetration holes may be drilled by press blanking, etching or other process.

Exemplary embodiments of the invention are described in detail below.

Exemplary Embodiment 1

A capacitor element was prepared by using a tantalum sintered metal weighing about 90 mg, having tantalum lead wires. The capacitor element measures 3.6×2.9×1.4 mm. Dissolving 5 ml of phosphoric acid in 1000 ml of deionized water, a solution at about 90° C. was prepared. First, while impregnating the capacitor element with the solvent, a voltage was applied while raising from 0 to 42 V at a rate of 5 mV/sec. In succession, a constant voltage of 42 V was applied for 3 hours. Thus, an oxide film dielectric layer was formed by anodic oxidation. This constitution was assumed to be a capacitor, and the capacitance. in the chemical formation solution was measured. As a result, the capacitance of the capacitor was 68 $\mu$F.

As polymerizable monomer, 3,4-ethylenedioxythiophene (EDOT) was added in methanol, and a monomer solution was prepared. This monomer solution was cooled by putting into a thermostatic oven at −30° C. Next, as oxidant, ferric naphthalene sulfonate was put in methanol, and by dissolving and stirring with a stirrer, an oxidant solvent was prepared. This oxidant solvent was cooled by putting into the thermostatic oven at −30° C. Mixing the monomer solution and oxidant solution, a mixed solution was prepared. In this case, the mixed solution was blended so that the concentration of the EDOT be 1 mol/liter and that the concentration of ferric naphthalene sulfonate be 0.18 mol/liter.

In the mixed solution, the capacitor element of rectangular parallelepiped was immersed for 2 minutes, and lifted. In this process, the capacitor element was impregnated with the mixed solution. On a hot-plate at 150° C. of higher temperature than the boiling point (64° C.) of methanol as the solvent, one side of the rectangular parallelepiped of the capacitor element was kept in contact for 30 seconds, and then the capacitor element kept in an oven at 130° C. for 20 minutes. A fluoroplastic tape is adhered to the surface of the hot-plate. Or the surface of the hot-plate is coated with fluoroplastic material. By such treatment, burning damage of the capacitor element due to contact is prevented. While evaporating the solvent (methanol) quickly by heating, the EDOT monomer was polymerized chemically, and a conductive polymer layer of poly(3,4-ethylenedioxythiophene) (PEDOT) was formed inside and on the surface of the capacitor element.

The capacitor element forming the conductive resin was washed by ethanol for 10 minutes, and washed by deionized water for 10 minutes, and dried in an oven at 120° C. for 30 minutes. Until the inside of the capacitor element was filled with conductive polymer layer and the surface was covered with conductive polymer layer, this process from immersion step in the mixed solution till drying step was repeated 15 times.

On the conductive polymer layer, a cathode layer having a carbon layer and a silver paint layer was formed. Further, a cathode lead wire was attached.

Further covering with an epoxy resin, it was aged. Thus, a total of 10 capacitors were prepared.

In these 10 capacitors, the capacitance and dissipation factor at 1 kHz and the impedance at 400 kHz were measured. The average values are shown in Table 1.

TABLE 1

|  | C ($\mu$F) | Tan δ (%) | Z (m Ω) |
| --- | --- | --- | --- |
| Embodiment 1 | 60 | 5.5 | 16 |
| Comparison 1 | 41 | 17 | 53 |
| Embodiment 2 | 202 | 6.8 | 19 |
| Comparison 2 | 56 | 14.7 | 62 |
| Embodiment 3 | 200 | 7.1 | 22 |
| Embodiment 4 | 8.1 | 2.5 | 8.9 |
| Embodiment 5 | 8.4 | 2.3 | 7.4 |

C: capacitance at 1 kHz, tan δ: dissipation factor at 1 kHz
Z: impedance at 400 kHz (impedance at resonance point in embodiments 4 and 5)

According to this embodiment, by heating the capacitor element impregnated with the mixed solution quickly to a temperature above the boiling point of the solvent, the solvent is evaporated and expanded in volume, and the evaporated solvent ejects from the voids of the surface of the sintered metal of the capacitor element. Therefore, if the conductive polymer layer generated by polymerization reaction is collected near the surface to block the voids, this conductive polymer layer is torn by the ejecting force, and clogging of the voids of the sintered metal surface by conductive polymer layer is prevented. Besides, by repetition of the process of impregnation with mixed solution, polymerization and washing, the conductive polymer layer is formed densely in the capacitor element. Moreover, by washing sufficiently after the conductive polymer layer Is formed, excessive oxidant is removed. As a result, a capacitor having a high capacitance attainment ratio, an excellent dissipation factor, and a superior impedance characteristic is obtained.

(Comparison 1)

In comparison 1, capacitors were fabricated in the same operation as in embodiment 1, except that the heating condition was,changed. The following points were changed. In the heating condition, the capacitors were immersed in the mixed solution, and lifted, and put in an oven at 60° C., lower than the boiling point of the solvent, for 60 minutes, then put in an oven at 130° C. for 20 minutes.

Results of measurement of characteristics of the obtained capacitors are shown in Table 1.

In comparison 1, after impregnating the capacitor element with the mixed solution, since it was not heated quickly above the boiling point of the solvent, the solvent was evaporate d gradually, and the force of the solvent ejecting from the voids of the sintered metal surface was weak. It was hence not possible to prevent clogging of the surface voids with the conductive polymer layer, and the surface voids are clogged by few times of repetition (once in an extreme case) of the process of impregnation with the mixed solution, polymerization, and washing. When the surface voids are clogged, if attempted to impregnate with the mixed solution, the mixed solution does not permeate into the inner part of the capacitor element. Therefore, the conductive polymer layer cannot be densely formed in the capacitor element by repetition of the process by many times. Besides, since the voids are clogged, after forming the conductive polymer layer, excessive oxidant cannot be removed completely by sufficient washing. As a result, in the capacitors of comparison 1, as shown in Table 1, the capacitance attainment ratio was low, and the dissipation factor and impedance characteristic were poor.

As clear from comparison between embodiment 1 and comparison 1 in Table 1, in embodiment 1, by heating quickly above the boiling point of the solvent after impregnating the capacitor element with the mixed solution, it was found that the capacitors high in capacitance attainment ratio, and excellent in dissipation factor and impedance characteristic could be obtained.

Exemplary Embodiment 2

In this embodiment, an anode foil 101 has an aluminum etched foil 102, and a dielectric layer 103 formed on its both sides by anodic oxidation. The anode foil 101 was used by cutting in a width of 2.3 mm and a length of 154 mm. As a cathode foil 104, an aluminum etched foil of 2.3 mm in width and 180 mm in length was used.

The anode foil 101 and cathode foil 104 were wound through a separator 105 made of Manila paper of 40 $\mu$m in thickness, and sealed with a winding tape 106, and a capacitor element 107 was obtained. Herein, the wound capacitor element 107 measured by about 7 mm in diameter, and 3.4 mm in the end-to-end spacing of the end upper portion 108 and end lower portion 109. To the anode foil 101 and cathode foil 104, preliminarily, an anode lead wire 110 and a cathode lead wire 111 are connected through an anode lead tab 112 and a cathode lead tab 113, respectively, and project from the end upper portion 108.

The cut section when forming the anode foil 101 and the anode lead tab 112 were treated by anodic oxidation. Supporting the anode lead wire 110, the capacitor element 107 was immersed in a 3% aqueous solution of ammonium adipate at 70° C. First, at a rate of 10 mV/sec, the voltage was raised from 0 to 14 V, and then a constant voltage of 14 V was applied for 10 minutes. In this way, a dielectric layer was formed on the cut section and the anode lead tab 112 by anodic oxidation. By running deionized water, it was washed for 10 minutes, and dried at 105° C. for 5 minutes.

Assuming this constitution to be a capacitor, the capacitance in the chemical formation solution was measured. As a result, the capacitance was 220 $\mu$F.

The monomer solution adding EDOT as polymerizable monomer in methanol was cooled by putting into a thermostatic oven at −30° C. Next, as oxidant, ferric naphthalene sulfonate was put in methanol, and by dissolving and stirring with a stirrer, the obtained oxidant solvent was cooled by putting into the thermostatic oven at −30° C. Mixing the monomer solution and oxidant solution, a mixed solution was prepared. At this time, the concentration of the mixed solution was adjusted so that the concentration of the EDOT be 1 mol/liter and that the concentration of ferric naphthalene sulfonate be 0.18 mol/liter.

In the mixed solution, the capacitor element 107 was immersed for 2 minutes, and the capacitor element was impregnated with the mixed solution, then the capacitor element was lifted. On a hot-plate at 150° C. of higher temperature than the boiling point (64° C.) of the solvent, the end lower portion 109 of the capacitor element was kept in contact for 30 seconds, and then kept in an oven at 130° C. for 20 minutes. By heating, the solvent was evaporated quickly, and the chemical polymerization reaction advanced, and a conductive polymer layer 114 composed of PEDOT was formed inside the capacitor element 107.

The capacitor element 107 was immersed in ethanol as organic solvent for 15 minutes, and washed. In succession, the capacitor element 107 was immersed and washed in deionized water for 15 minutes. It was then dried in an oven at 120° C. for 30 minutes.

Until a specified amount of conductive polymer layer 114 was formed inside of the capacitor element 107, the process from immersion step till drying step was repeated 13 times.

After forming the conductive polymer layer 114, the capacitor element 107 was put in a cylindrical aluminum case with a bottom, and its opening was sealed with an epoxy resin. Then it was treated by aging. Thus, a total of 10 capacitors were completed. In these samples, the characteristics were evaluated in the same manner as in embodiment 1. The average values are recorded in Table 1.

According to this embodiment, by the evaporating and ejecting force of the solvent, clogging of the end surface by conductive polymer layer is prevented. Accordingly, by repetition of the process of impregnation with mixed solution, polymerization and washing, the conductive polymer layer is formed densely in the capacitor element. Moreover, by washing sufficiently after the conductive polymer layer is formed, excessive oxidant is removed. As a result, a capacitor having a high capacitance attainment ratio, an excellent dissipation factor, and a superior impedance characteristic is obtained as shown in Table 1.

(Comparison 2)

In comparison 2, capacitors were fabricated in the same operation as in embodiment 2, except that the heating condition was changed. In this comparative example, the heating condition was changed as follows. After immersing the capacitor element in the mixed solution, the capacitor element was impregnated with the mixed solution, and then the capacitor element was taken out of the mixed solution, and was put in an oven at 60° C. lower than the boiling point of the solvent, for 60 minutes, then put in an oven at 130° C. for 20 minutes.

Results of measurement of characteristics are shown in Table 1.

In comparison 2, after impregnating the capacitor element with the mixed solution, it was not heated quickly above the boiling point of the solvent. Therefore, the solvent contained in the capacitor element was evaporated gradually, and the force of the solvent ejecting from the end surface of the capacitor element was weak. Therefore, the end surface of the capacitor element is clogged with the conductive polymer layer by few times of repetition (once in an extreme case) of the process of impregnation with the mixed solution, polymerization, and washing. When the end face is clogged, if attempted to impregnate with the mixed solution, the mixed solution does not permeate into the inner part of the capacitor element. Therefore, the conductive polymer layer cannot be densely formed in the capacitor element. Besides, since excessive oxidant cannot be removed completely in the washing step after forming the conductive polymer layer. Due to these reasons, in the capacitor of comparison 2, as shown in Table 1, the capacitance attainment ratio was low, and the dissipation factor and impedance characteristic were poor.

As clear from comparison between embodiment 2 and comparison 2 in Table 1, the capacitor manufactured in embodiment 2 was found to have a high capacitance attainment ratio, an excellent dissipation factor and a superior impedance characteristic.

Exemplary Embodiment 3

In this embodiment, capacitors were completed in the same manufacturing conditions as in embodiment 2 except that the composition of the mixed solution and the polymerization condition were changed. The following points were changed. The mixed solution was composed of methanol as solvent, 0.62 mol/liter of pyrrole as polymerizable monomer, and 0.35 mol/liter of ferric naphthalene sulfonate as oxidant. In the polymerization condition, the capacitor element was immersed in the mixed solution for 10 seconds, and the capacitor element was impregnated with the mixed solution. Then the capacitor element was taken out. Thus, the capacitor element impregnated with the mixed solution was obtained. Then, on a hot-plate at 110° C. of higher temperature than the boiling point (64° C.) of the solvent, the end lower portion of the capacitor element was kept in contact for 20 seconds, and then the capacitor element was let stand in the atmosphere of about 25° C. for 20 minutes. Thus, a conductive polymer layer made of polypyrrole was formed in the capacitor element. Until a specified amount of conductive polymer layer was formed inside of the capacitor element, the process from immersion and impregnation step till drying step was repeated 8 times. Thus, the capacitor was completed.

In the obtained capacitors, the characteristics were evaluated in the same manner as in embodiment 1. The average values are recorded in Table 1.

According to this embodiment, in the constitution in which polypyrrole was formed as conductive polymer layer, a capacitor having a high capacitance attainment ratio, an excellent dissipation factor, and a superior impedance characteristic was obtained as shown in Table 1.

Exemplary Embodiment 4

In this embodiment, as the dielectric layer, a high-molecular polyimide was used instead of the anodic oxidation film. The other constitution was same as in embodiment 2, and a capacitor was completed. Replacing the dielectric layer with polyimide, the process until forming the conductive polymer layer is explained below.

In the embodiment, a dielectric layer made of polyimide is disposed on both sides of an aluminum etched foil by electrodeposition. That is, first, biphenyl tetracarboxylic dianhydride, p-phenylene diamine and N-methyl pyrrolidone are mixed. By reaction of this mixed solution in nitrogen reflux, polyamic acid was obtained. The obtained polyamic acid was diluted in N,N-dimethyl amide, and triethylamine was added. Thus, polyamate solution was obtained. In this solution, ethanol was added, and finally the electrodeposition solution was prepared so as to contain 0.15% of polyamic acid.

The method of forming the anode is explained below. In this electrodeposition solution, aluminum etched foil is immersed. Between it and the electrode disposed at a spacing in the electrolyte, a voltage of 30 V was applied. Thus, the polyamic acid film was electrodeposited on the aluminum etched foil. Afterwards, by heating for 1 hour at 250° C., the polyamic acid was transformed into polyimide. The electrodeposition step and heating step were repeated three times, and a dielectric layer made of polyimide was formed.

The aluminum etched foil forming the dielectric layer was cut in a size of 2.3 mm in width and 154 mm in length, and an anode foil was prepared. A cathode foil was an aluminum etched foil of 2.3 mm in width and 180 mm in length.

The anode foil and cathode foil were wound through a separator made of Manila paper of 40 $\mu$m in thickness, and sealed with a winding tape, and a capacitor element was obtained. To the anode foil and cathode foil, preliminarily, an anode lead wire and a cathode lead wire are connected through an anode lead tab and a cathode lead tab, respectively, and project from the end upper portion of the capacitor element.

While supporting the anode lead wire, the capacitor element was immersed in the electrodeposition solution same as above, and a voltage of 30 V was applied between this anode foil as the anode and the electrode disposed at a spacing. Thus, a polyamic acid film was electrodeposited. Then, heating for 1 hour at 250° C., the polyamic acid was transformed into polyimide. Thus, the dielectric layer made of polyimide was formed on the cut section when forming the anode foil and anode lead tab.

Assuming this constitution to be a capacitor, the capacitance in the chemical formation solution composed of aqueous solution of adipic acid measured. As a result, the capacitance was 9 $\mu$F.

The obtained sample was evaluated characteristically same as in embodiment 1. Obtained average values are shown in Table 1.

According to the embodiment, in the case of using high-molecular polyimide as the dielectric layer, as shown in Table 1, a film capacitor having a high capacitance attainment ratio, an excellent dissipation factor, and a superior impedance characteristic was obtained.

Exemplary Embodiment 5

In this embodiment, as the dielectric layer, a copolymer of acrylic acid, methacrylic acid, and styrene was used. Capacitors were completed in the same manner as in embodiment 2 in other constitution. The process of using a copolymer of acrylic acid, methacrylic acid, and styrene, and forming a conductive polymer layer is explained below.

The dielectric layer composed of a copolymer of acrylic acid, methacrylic acid, and styrene was disposed on both sides of the aluminum etched foil in the following procedure. The composition of the solution used for electrodeposition comprises 10 wt. % of solid content, 86 wt. % of deionized water, and 4 wt. % of butyrocellosolve. The solid content is composed of a copolymer of acrylic acid and methacrylic acid of molecular weight of about 30,000, a benzoguanamine resin, and a carboxylic group neutralized by trimethylamine. The ratio of the copolymer and trimethylamine is 7:3. Exactly 50% of the carboxylic group is neutralized by trimethylamine. The carboxylic group neutralized by trimethylamine is used for dispersing the solid content in the electrodeposition solution.

In this electrodeposition solution, an aluminum etched foil was immersed, and it was used as the anode, and a voltage was applied between it and an electrode disposed at a spacing, and a constant current electrodeposition was performed until reaching 10 V at a current density of 0.3 mA/cm$^2$, and further a constant voltage electrodeposition was performed for 15 minutes at 10 V.

Next, after washing in deionized water at 80° C. for 20 minutes, it was heated for 30 minutes at 180° C. In this way, crosslinking reaction was conducted with the benzoguanamine resin. This process was repeated three times, and a dielectric layer was formed.

The aluminum etched foil having the dielectric layer was cut in a size of 2.3 mm in thickness and 154 mm in length, and an anode foil was prepared. A cathode foil was an aluminum etched foil of 2.3 mm in width and 180 mm in length.

The anode foil and cathode foil were wound through a separator made of Manila paper of 40 μm in thickness, and sealed with a winding tape, and a capacitor element was obtained. To the anode foil and cathode foil, preliminarily, an anode lead wire and a cathode lead wire are connected through an anode lead tab and a cathode lead tab, respectively, and project from the end upper portion.

While supporting the anode lead wire, the capacitor element was immersed in the electrodeposition solution same as above, and a voltage was applied between this anode fail as the anode and the electrode disposed at a spacing, and a constant current electrodeposition was performed until reaching 10 V at a current density of 0.3 mA/cm$^2$, and further a constant voltage electrodeposition was performed for 15 minutes at 10 V.

Next, after washing in deionized water at 80° C. for 20 minutes, it was heated for 30 minutes at 180° C., and crosslinking reaction was conducted with the benzoguanamine resin.

Thus, the dielectric layer made of a copolymer of acrylic acid, methacrylic acid and styrene was formed on the cut section when forming the anode foil and anode lead tab.

Assuming this constitution to be a capacitor, the capacitance in the chemical formation solution composed of aqueous solution of adipic acid measured. As a result, the capacitance was 9.5 μF.

The characteristics were measured same as in embodiment 1, and average values are shown in Table 1.

According to the embodiment, in the case of using a copolymer of high-molecular acrylic acid, methacrylic acid and styrene as the dielectric layer, as shown in Table 1, it was known that a film capacitor having a high capacitance attainment ratio, an excellent dissipation factor, and a superior impedance characteristic is realized.

Exemplary Embodiment 6

In this embodiment, capacitors were completed in the same manner as in embodiment 2 except that the chemical formation voltage of anodic oxidation was changed from 14 V to 80 V and that the conductive polymer layer was impregnated with electrolyte. The impregnation method of electrolyte is explained below.

After forming the conductive polymer layer in the same manner as in embodiment 2, the capacitor element was immersed in electrolyte, and by reducing pressure, the conductive polymer layer was impregnated with the electrolyte. The electrolyte was a γ-butyrolactone solution containing 20% of phthalic acid monomethyl triethyl ammonium.

After completing the capacitor, a voltage was applied and the dielectric strength was investigated, and the capacitor was found to withstand up to 38 V. Incidentally, with out impregnation of the conductive polymer layer with electrolyte, the withstand voltage of the capacitor was 26 V.

According to the embodiment, after forming the conductive polymer layer densely inside the capacitor element, by impregnating the conductive polymer layer with electrolyte, the restoration capacity of the defects of dielectric layer can be enhanced, so that a capacitor of an excellent dielectric strength is realized.

As the solvent, methanol was used, but it is not limited and various other solvents such as water, ethanol, isopropanol, butanol or their mixtures can be used.

In the embodiment, as the high polymer used as the dielectric layer, polyimide and a copolymer of acrylic acid, methacrylic acid and styrene were used, but other polymer materials can be used as far as a thin film can be formed, and the invention is not limited to the variety.

In the embodiment, the valve metal is tantalum and aluminum, but zirconium, niobium, hafnium, titanium, or their intermetallic compounds may be also used.

Exemplary Embodiment 7

Figure 2:
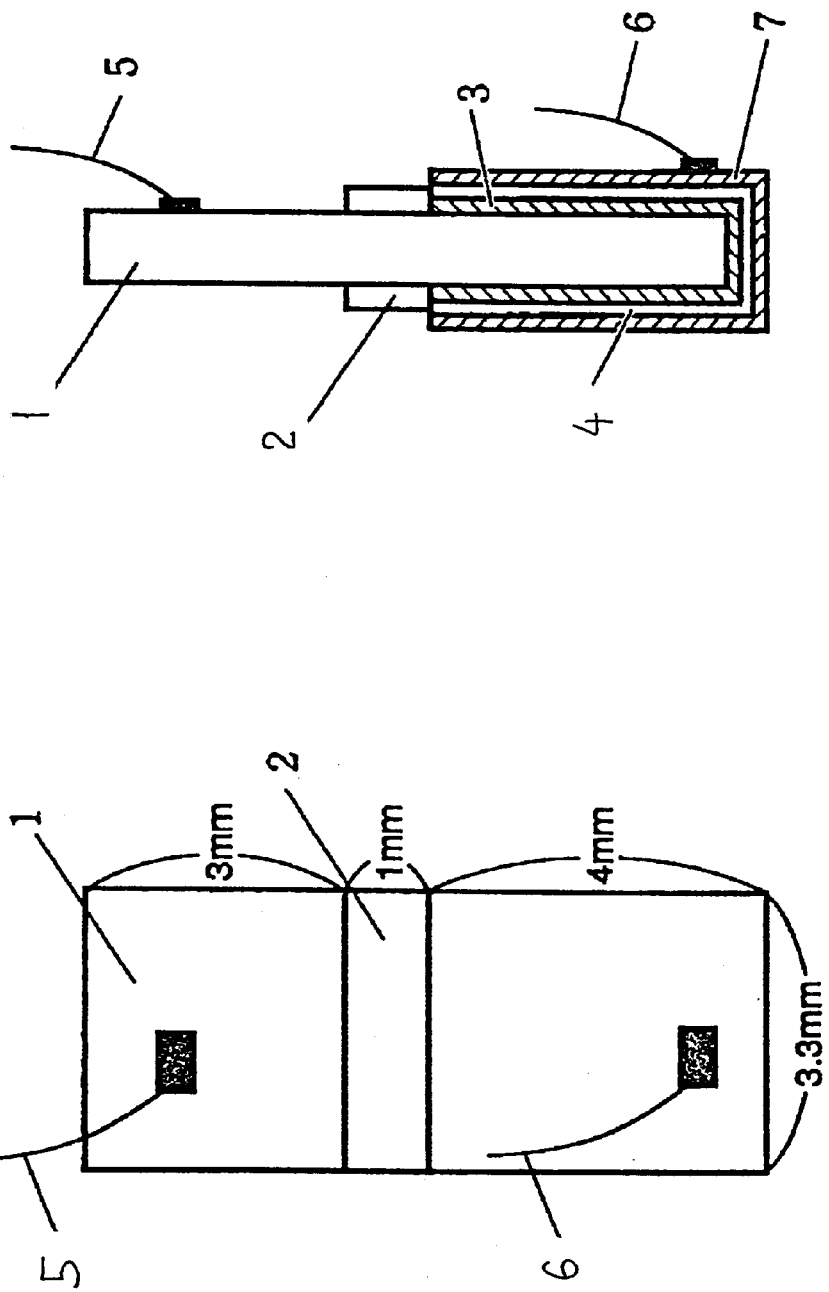
FIG. 2(*a*) is a front view of a capacitor element in other embodiment of the invention, and FIG. 2(*b*) is its sectional view.

This embodiment is explained by referring to FIG. 2.

An aluminum etched foil 1 of 8 mm long×3.3 mm wide was partitioned into 4 mm and 3 mm portions, and 1 mm wide polyimide tape 2 was adhered on both sides.

An anode lead wire 5 was connected to the 3 mm×3.3 mm portion of the aluminum etched foil 1. In the 4 mm×3.3 mm portion of the aluminum etched foil 1, using 3% aqueous solution of ammonium adipate at 70° C., the voltage was raised from 0 to 10 V at a rate of 10 mV/sec, and then successively a constant voltage of 10 V was applied for 40 minutes. Thus, by anodic oxidation, a dielectric layer 3 was formed. After washing for 10 minutes by running deionized water, it was dried for 5 minutes at 105° C. Assuming this constitution to be a capacitor, the capacitance in the chemical formation solution was measured. As a result, the capacitance was 18 μF.

The oxidant composed of ferric naphthalene sulfonate of transition metal salt was dissolved in a solvent composed of 5.2 wt. % of water and 57.65 wt. % of ethanol, and a solution of ferric naphthalene sulfonate was prepared. In 7.5 g of ethanol of the solvent, 3 g of the solution of ferric naphthalene sulfonate was mixed. Further, 1.41 g of 3,4-ethylenedioxythiophene monomer, a thiophene derivative monomer, was mixed, and stirred, and their mixed solution was prepared.

In the mixed solution, the aluminum etched foil 1 having the dielectric layer 3 was immersed for 1 minute, and the aluminum etched foil 1 impregnated with the mixed solution was lifted from the solution. Then, the aluminum etched foil 1 impregnated with the mixed solution was put in an oven at 120° C. higher than the boiling point of the solvent, and was heated quickly, and let stand for 20 minutes therein. By heating, the solvent was quickly evaporated, and the chemical polymerization reaction was advanced, and a conductive polymer layer 4 composed of poly(3,4-ethylenedioxythiophene) was formed on the dielectric layer 3.

Consequently, in the ethanol of the organic solvent, the aluminum etched foil 1 having the conductive polymer layer 4 was immersed for 10 minutes and washed. Successively, the aluminum etched foil 1 was immersed for 10 minutes in deionized water and washed. It was dried for 5 minutes in an oven at 105° C.

The process from immersion and application till drying was repeated 12 times until the conductive polymer layer 4 was grown to a specified thickness.

After forming the conductive polymer layer 4, a cathode layer 7 was formed by a carbon layer and a silver paint layer, and a cathode led wire 6 was attached thereon.

After covering with an epoxy resin, it was treated by aging, and a total of 10 capacitors were completed.

In these 10 capacitors, capacitance and dissipation factor at 1 kHz, impedance at 400 kHz, and leak current after application of rated voltage of 6.3 V for 2 minutes were measured. The capacitors were further exposed to the atmosphere of 85° C. and 85% humidity, and 6.3 V was applied, and the heat and humidity resistance was tested, and the capacitance, dissipation factor, impedance and leak current were also measured. Their average values are recorded in Table 2.

TABLE 2

|  | Initial | | | | After loaded life test of 85° C., 85%, 500 hours | | | |
|---|---|---|---|---|---|---|---|---|
|  | C (µF) | Tan δ (%) | Z (mΩ) | LC (µA) | C (µF) | tan δ (%) | Z (mΩ) | LC (µA) |
| Embodiment 7 | 16.3 | 1.7 | 28 | 0.051 | 16.1 | 1.8 | 35 | 0.052 |
| Comparison 7 | 15.4 | 2.1 | 35 | 0.97 | 6.3 | 9.5 | 221 | 6.2 |
| Embodiment 8 | 0.018 | 1.0 | 16 | 0.033 | 0.017 | 1.1 | 17 | 0.035 |
| Embodiment 9 | 195.6 | 6.7 | 20 | 0.43 | 193.6 | 6.9 | 26 | 0.51 |
| Comparison 9 | 50.2 | 14.3 | 52 | 6.4 | 21.6 | 27.7 | 183 | 16.9 |
| Embodiment 10 | 198.4 | 6.5 | 18 | 0.59 | 195.6 | 6.8 | 23 | 0.64 |
| Embodiment 11 | 1950 | 11.3 | 7.6 | 1.62 | 1903 | 11.8 | 8.1 | 1.85 |

C: capacitance at 1 kHz,
tan δ: dissipation factor at 1 kHz,
Z: impedance at 400 kHz,
LC: leak current after applying rated voltage for 2 minutes According to the embodiment, by heating quickly over the boiling point of the solvent after applying the mixed solution on the dielectric layer, the solvent is evaporated quickly, and the polymerization reaction proceeds in the uniformly mixed state of monomer and oxidant. In this process, a conductive polymer layer of large molecular weight and uniform layer is obtained. Besides, the unreacted monomer and excessive oxidant are decreased extremely as compared with the case of promoting polymerization reaction by letting stand at temperature below the boiling point of the solvent. As a result, when washing by using organic solvent, the generated conductive polymer is hardly swollen and is hardly peeled. Hence, by sufficient washing, unreacted monomer and excessive oxidant can be removed. As a result, a capacitor having an excellent stability in high temperature and high humidity condition is obtained.

(Comparison 7)

Capacitors were fabricated in the same operation as in the above embodiment, except that the heating condition and washing condition were changed. The following processes were changed. First, the capacitors were immersed in the mixed solution, and lifted, and put in an oven at 60° C., lower than the boiling point of the solvent, for 60 minutes, then put in an oven at 120° C. for 20 minutes. Thus, the heating condition was changed. The capacitors were washed only in deionized water for 15 minutes. Thus, the washing condition was changed.

Characteristics of the obtained capacitors were measured. The results are shown in Table 2.

In comparison 7, after applying the mixed solution to the dielectric layer, since it was not heated quickly above the boiling point of the solvent, the monomer and the oxidant were not mixed uniformly, and the oxidant deposited partly to cause phase separation. As a result, there was a fluctuation in the degree of polymerization in the conductive polymer layer formed by polymerization reaction, and the unreacted monomer and oxidant were much left over. Thus, the conductive polymer layer was likely to be swollen to the organic solvent and likely to be peeled off. Therefore, it cannot be washed by using organic solvent. Besides, the oxidant used herein is hardly dissolved in deionized water, and the oxidant cannot be removed by washing by using deionized water.

In comparison 7, as shown in Table 2, the stability in high temperature and high humidity condition was poor. It seems to be caused by corrosion of the dielectric layer due to oxidant left over in the conductive polymer layer, thereby leading to deterioration of characteristic.

As clear from the comparison between embodiment 7 and comparison 7 in Table 2, in embodiment 7, by heating quickly over the boiling point of the solvent after applying mixed solution to the dielectric layer and washing by organic solvent, it was found possible to obtain a capacitor having an excellent stability in high temperature and high humidity condition.

Exemplary Embodiment 8

On an aluminum foil of 20 mm×20 mm, instead of forming a dielectric layer made of oxide film as in embodiment 7, a polyimide thin film of 0.5 µm in thickness was formed by spin coating, and the dielectric layer was formed from this polyimide thin film, and otherwise in the same condition as in embodiment 7, a total of 10 capacitors were fabricated. The characteristics were evaluated same as in embodiment 1, and the average values are shown in Table 2.

Herein, the capacitance attainment ratio was 85%.

According to the embodiment, by heating quickly over the boiling point of the solvent after applying mixed solution to the dielectric layer and washing by organic solvent, as shown in Table 2, the capacitor excellent in stability in high temperature and high humidity condition can be obtained.

Exemplary Embodiment 9

This embodiment is described by reference to FIG. 3.

An anode foil 11 was prepared by applying a dielectric layer 13 on both sides of an aluminum etched foil 12 by anodic oxidation, and cutting into a size of 2.3 mm in width and 154 mm in length. A cathode foil 14 was an aluminum etched foil of 2.3 mm in width and 180 mm in length.

The anode foil 11 and cathode foil 14 were wound through a separator 15 made of Manila paper of 40 µm in thickness, and sealed with a winding tape 16, and a capacitor element 17 was obtained. Herein, the wound capacitor element 17 measured by about 7 mm in diameter, and 3.4 mm in the end-to-end spacing of the end upper portion 18 and end lower portion 19. To the anode foil 11 and cathode foil 14, preliminarily, an anode lead wire 20 and a cathode lead wire 21 are connected electrically, and project from the end upper portion 18.

The cut section when forming the anode foil 11 was treated by anodic oxidation. Supporting the anode lead wire 20, the capacitor element 17 was immersed in a 3% aqueous solution of ammonium adipate at 70° C. First, at a rate of 10 mV/sec, the voltage was raised from 0 to 14 V, and then a constant voltage of 14 V was applied for 10 minutes, and a dielectric layer was formed on the cut section by anodic oxidation. By running deionized water, it was washed for 10 minutes, and dried at 105° C. for 5 minutes. Assuming this constitution to be a capacitor, the capacitance in the chemical formation solution was measured. As a result, the capacitance was 220 µF.

An oxidant composed of ferric naphthalene sulfonate of transition metal salt was dissolved in a solvent composed of 5.2 wt. % of water and 57.65 wt. % of ethanol, and a solution of ferric naphthalene sulfonate was prepared. An oxidant composed of ferric triisopropyl naphthalene sulfonate of transition metal salt was dissolved in 60 wt. % of ethanol, and a solution of ferric triisopropyl naphthalene sulfonate was prepared. Next, in 6.45 g of ethanol, 0.9 g of solution of ferric naphthalene sulfonate and 2.55 g of solution of ferric triisopropyl naphthalene sulfonate were mixed. Moreover, 1.29 g of 3,4-ethylenedioxythiophene monomer was mixed and stirred, and a mixed solution was prepared.

In the mixed solution, the capacitor element 17 was immersed for 2 minutes, and was impregnated and lifted, and was heated quickly by putting into an oven at 130° C. higher than the boiling point of the solvent, and left stand for 20 minutes. By heating, the solvent was evaporated quickly, and the chemical polymerization reaction advanced, and a conductive polymer layer 22 composed of poly(3,4-ethylenedioxythiophene) was formed inside the capacitor element 17.

The capacitor element 17 was immersed in ethanol as organic solvent for 15 minutes, and washed. In succession, the capacitor element 17 was immersed and washed in deionized water for 15 minutes. It was then dried in an oven at 120° C. for 30 minutes.

Until a specified amount of conductive polymer layer 22 was formed inside of the capacitor element 17, the process from immersion and application till drying was repeated 10 times.

After forming the conductive polymer layer 22, the capacitor element 17 was put in a cylindrical aluminum case with a bottom, and its opening was sealed with an epoxy resin, and it was treated by aging, so that a total of 10 capacitors were completed.

In these 10 capacitors, capacitance and dissipation factor at 1 kHz, impedance at 400 kHz, and leak current after application of rated voltage of 4 V for 2 minutes were measured. The capacitors were further exposed to the atmosphere of 85° C. and 85% humidity, and 4 V was applied, and the heat and humidity resistance was tested, and the capacitance, dissipation factor, impedance and leak current were also measured. Their average values are recorded in Table 2.

According to this embodiment, by heating quickly over the boiling point of the solvent after impregnating the capacitor element with the mixed solution, the evaporating and ejecting force of the solvent and prevent clogging of the end surface by conductive polymer layer, and therefore by repetition of the process of impregnation with mixed solution, polymerization and washing, the conductive polymer layer is formed densely in the capacitor element, so that the capacitor of high capacitance attainment ratio can be obtained as shown in Table 2.

Moreover, by heating quickly over the boiling point of the solvent, the solvent is evaporated quickly, and the polymerization reaction proceeds in the uniformly mixed state of monomer and oxidant, so that a conductive polymer layer of large molecular weight and uniform layer is obtained, and still more the unreacted monomer and excessive oxidant are decreased as compared with the case of promoting polymerization reaction by letting stand at temperature below the boiling point of the solvent, and only a small amount is left over. As a result, when washing by using organic solvent, it is hardly swollen and is hardly peeled, and hence by sufficient washing, unreacted monomer and excessive oxidant can be removed, so that a capacitor having an excellent stability in high temperature and high humidity condition is obtained as shown in Table 2.

(Comparison 9)

Capacitors were fabricated in the same operation as in embodiment 9, except that the heating condition and washing condition were changed. The following processes were changed. First, the heating condition was changed as follows: the capacitor elements were immersed in the mixed solution, and lifted, and put in an oven at 60° C., lower than the boiling point of the solvent, for 60 minutes, then put in an oven at 130° C. for 20 minutes. The washing condition was changed to washing only by deionized water for 20 minutes.

Characteristics were measured, and the results are shown in Table 2.

In comparison 9, after impregnating the capacitor element with the mixed solution, since it was not heated quickly above the boiling point of the solvent, the solvent was evaporated gradually, and the force of the solvent ejecting from the end surface was weak. Therefore, clogging of the end surface of the capacitor element with the conductive polymer layer cannot be prevented, and by few times of repetition (once in an extreme case) of the process of impregnation with the mixed solution, polymerization, and washing, the end surface is clogged with the conductive polymer layer. When the end face is clogged, if attempted to impregnate with the mixed solution, the mixed solution does not permeate into the inner part of the capacitor element. Therefore, the conductive polymer layer cannot be densely formed in the capacitor element by repeating the process more times. Thus, in comparison 9, the capacitance attainment ratio was low as shown in Table 2.

Besides, by washing with deionized water only, the oxidant cannot be removed, and the stability in high temperature and high humidity condition was poor as shown in Table 2.

As clear from the comparison between embodiment 9 and comparison 9 in Table 2, in embodiment 9, by heating quickly over the boiling point of the solvent after impregnating the capacitor element with the mixed solution and washing by organic solvent, it was found possible to obtain a capacitor having a high capacitance attainment ratio and an excellent stability in high temperature and high humidity condition.

Exemplary Embodiment 10

Figure 3:
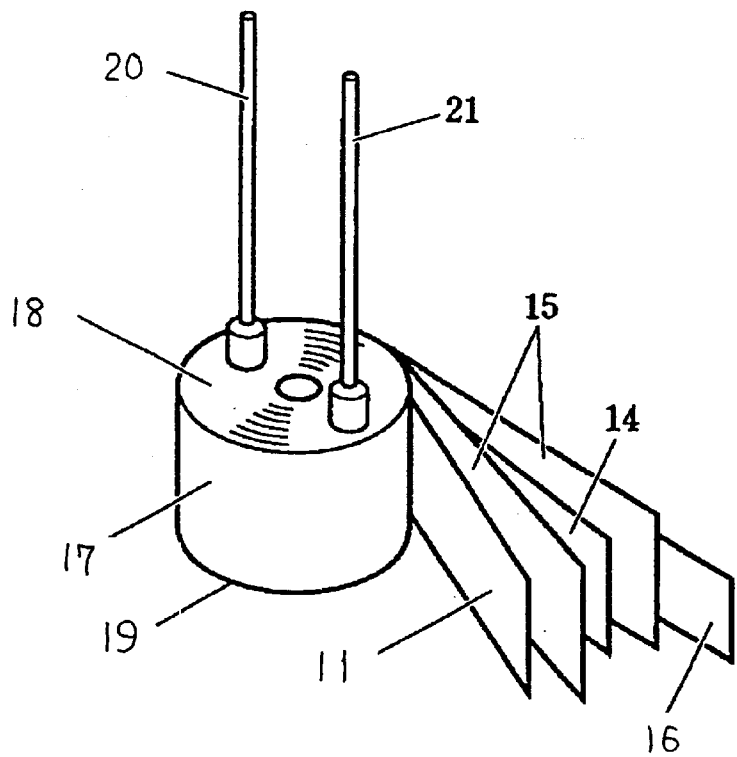
FIG. 3(*a*) is an outline view of a capacitor element in a different embodiment of the invention, and FIG. 3(*b*) is its inside magnified view.
Figure 3:
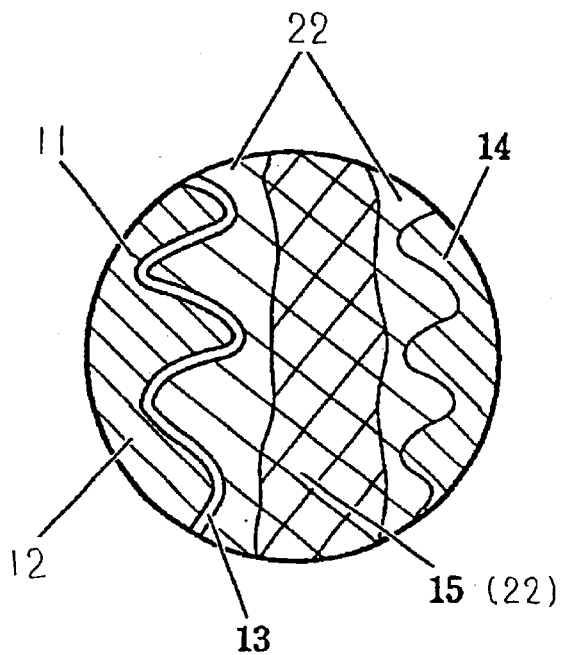

This embodiment is described while referring to FIG. 3.

Capacitors were fabricated in the same operation as in embodiment 9, except that the heating condition was changed. The following points were changed. The capacitor element was immersed in the mixed solution and impregnated, then lifted, and the end lower portion 19 of the capacitor element was put on a hot-plate of 130° C. higher than the boiling point of the solvent and kept in contact for 30 seconds, and then it was put in an oven at 130° C. for 20 minutes.

Characteristics were evaluated same as in embodiment 9, and the average values are shown in Table 2. According to the embodiment, by heating quickly over the boiling point of the solvent by using the hot-plate after impregnating the capacitor element with the mixed solution, and washing with organic solvent same as in embodiment 9, the capacitor of high capacitance attainment ratio and an excellent stability in high temperature and high humidity condition can be obtained as shown in Table 2.

Exemplary Embodiment 11

Figure 4:
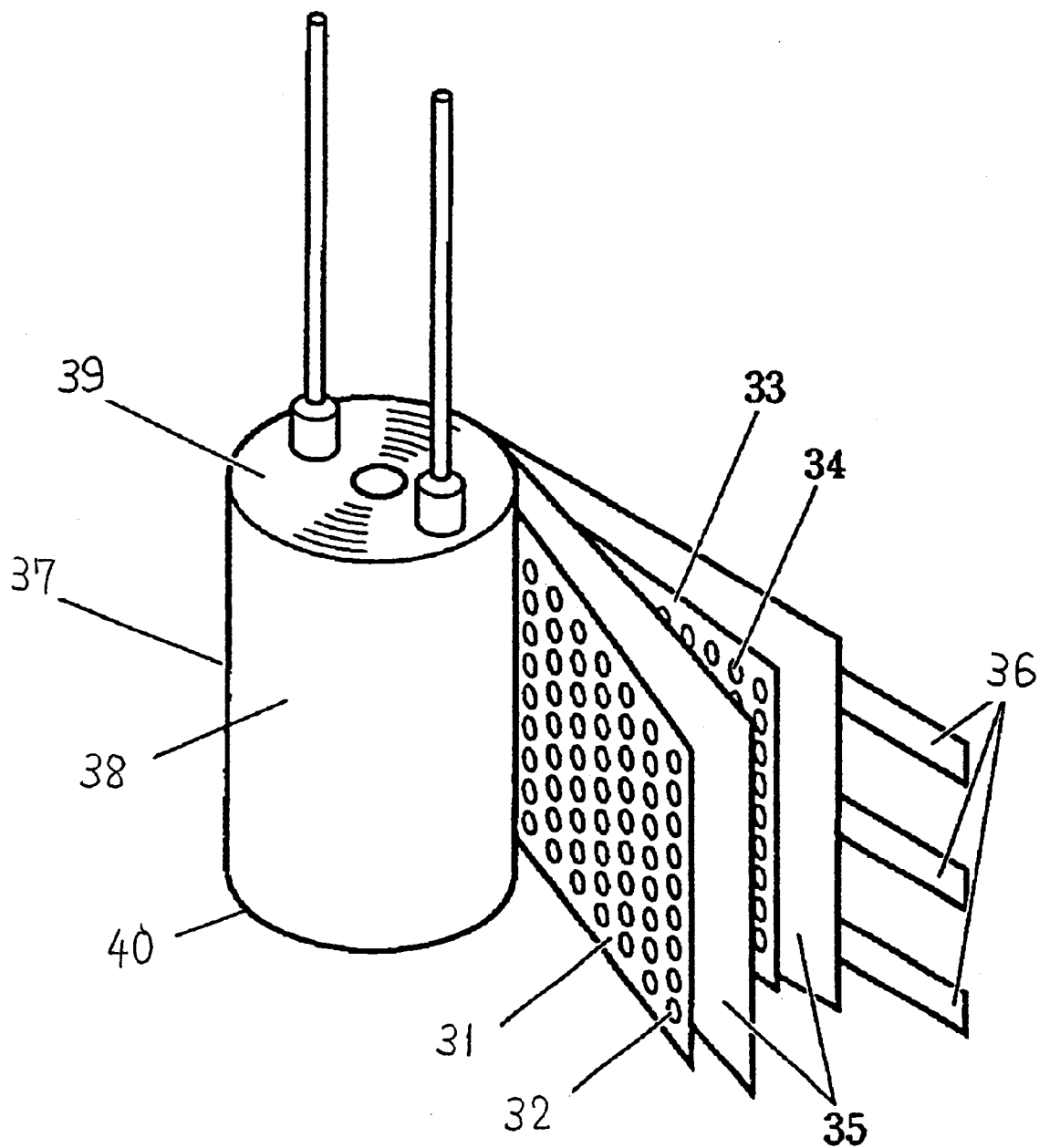
FIG. 4 is an outline view of a capacitor element in other different embodiment of the invention.

This embodiment is described while referring to FIG. 4.

An anode foil 31 was prepared by using an aluminum etched foil having multiple penetration holes 32 of 0.5 mm in diameter formed by press blanking, and treated by etching and anodic oxidation, and cutting into a size of 12 mm in width and 331 mm in length. A cathode foil 33 was prepared by using an aluminum etched foil similarly having multiple penetration holes 34 of 0.5 mm in diameter and treated by etching, and cutting into a size of 12 mm in width and 363 mm in length.

The anode foil 31 and cathode foil 33 were wound through a separator 35 of Manila paper of 40 $\mu$m in thickness, and sealed with a winding tape 36, and a capacitor element 37 was obtained. The capacitor element 37 measured about 11 mm in diameter, and 14 mm in the end-to-end spacing between the end upper portion 39 and end lower portion 40. Three winding tapes 36 of 1.5 mm in width were used so as not to cover the entire area of the side surface 38 of the capacitor element 37. Therefore, the inside of the capacitor element 37 is not only opened to the atmosphere from the end upper portion 39 and end lower portion 40 through the gaps of the anode foil 31, separator 35 and cathode foil 33, but also opened to the atmosphere from the side surface 38 through the gaps of the penetration holes 32, separator 35, and penetration holes 34.

The cut section of the anode foil 31 was treated by anodic oxidation in the same condition as in embodiment 9, and the capacitance in the chemical formation solution was measured, and it was 2200 $\mu$F.

Otherwise, the capacitors were manufactured in the same operation as in embodiment 9.

Characteristics were evaluated same as in embodiment 9, and average values are shown in Table 2.

According to the embodiment, by forming multiple penetration holes in the anode foil and cathode foil, the inside of the capacitor element is opened to the atmosphere not only from the end surface but also from the side surface. Owing to the impregnation with the mixed solution from the side surface as well as from the end surface, ejection of solvent vapor by quick heating over the boiling point of the solvent, and promotion of permeation of organic solvent for washing, even in the capacitor element of a large capacitance with a wide end-to-end spacing, the capacitor of high capacitance attainment ratio and an excellent stability in high temperature and high humidity condition can be obtained as shown in Table 2.

Herein, the solvent is a mixture of water and ethanol, but not limited to this alone, for example, water alone, ethanol alone, methanol, isopropanol, butanol, other solvents may be used either alone or in mixture.

In embodiment 8, polyimide is used as the high polymer for dielectric layer, but other high polymer material than polyimide may be used as far a thin film can be formed, and the invention is not limited to its kind. On the aluminum foil, the polyimide thin film is formed as dielectric layer by spin coating, but, for example, the polyimide film may be formed on the aluminum foil surface by electrodeposition, and such dielectric layer may be used as an electrode of the film capacitor, and the invention is not limited to any particular forming method.

In the embodiments, 3,4-ethylenedioxythiophene is used as polymerizable monomer, but derivatives having other substituents may be also used.

In the embodiments, the valve metal is aluminum, but tantalum, zirconium, niobium, hafnium, titanium, or their intermetallic compounds may be also used.

In the capacitors of the foregoing embodiments, the conductive polymer layer is formed in only one of the electrodes of the capacitor, but the both electrodes may be also made of conductive polymer layer.

Thus, according to the invention, the capacitor having high capacitance attainment ratio, excellent dissipation factor, excellent impedance characteristic, and excellent stability in high temperature and high humidity condition can be obtained.

The invention therefore brings about advantageous effects of obtaining the capacitor high in capacitance attainment ratio and excellent in dissipation loss and impedance characteristic.

Moreover, by impregnating the conductive polymer layer with electrolyte, the restoration capacity of defects of the dielectric layer can be enhanced, so that a capacitor excellent in dielectric strength characteristic can be obtained.

What is claimed is:

1. A method of manufacturing a capacitor having a conductive polymer layer on a capacitor element, said method comprising:
   (a) preparing a mixed solution comprising a polymerizable monomer, an oxidant, and a solvent,
   (b) impregnating with said mixed solution a capacitor element having internal voids continuous on a surface thereof,
   (c) removing said capacitor element impregnated with said mixed solution from said mixed solution, and
   (d) heating said capacitor element impregnated with said mixed solution to evaporate said solvent and form a conductive polymer layer on said capacitor element by a chemical polymerization reaction of said polymerizable monomer and said oxidant, said heating being carried out at a temperature above the boiling point of the solvent at a rate capable of generating a force able to tear open said conductive polymer formed to cover said internal voids by an evaporated solvent generated by heating said solvent contained in said internal voids.

2. The method of claim 1, further comprising washing said conductive polymer layer with a further solvent.

3. The method of claim 2, comprising repeating said washing step a plurality of times.

4. The method of claim 1, wherein said polymerizable monomer is 3,4-ethylenedioxythiophene.

5. The method of claim 1, wherein step (a) is carried out at a temperature so that said mixed solution is at a temperature lower than room temperature.

6. The method of claim 1, wherein said capacitor element has a dielectric layer.

7. The method of claim 6, wherein said mixed solution is adhered to said dielectric layer in step (b) and step (d) is carried out to cause a chemical polymerization in a uniformly mixed state of said polymerizable monomer and said oxidant.

8. A method of manufacturing a capacitor having a conductive polymer layer on a capacitor element comprising a sintered metal, said method comprising:
   (a) preparing a mixed solution comprising a polymerizable monomer, an oxidant, and a solvent,
   (b) impregnating with said mixed solution a capacitor element comprising a sintered metal and having internal voids in said sintered metal continuous on a surface thereof,
   (c) removing said capacitor element impregnated with said mixed solution from said mixed solution, and
   (d) heating said capacitor element impregnated with said mixed solution to evaporate said solvent and form a conductive polymer layer on said capacitor element by a chemical polymerization reaction of said polymerizable monomer and said oxidant, said heating being carried out at a temperature above the boiling point of the solvent at a rate capable of generating a force able to tear open said conductive polymer formed to cover said internal voids by an evaporated solvent generated by heating said solvent contained in said internal voids.

9. A method of manufacturing a capacitor having a conductive polymer layer on a capacitor element having an anode foil and a cathode foil, wound through a separator, said method comprising:

(a) preparing a mixed solution comprising a polymerizable monomer, an oxidant, and a solvent, (b) impregnating with said mixed solution a capacitor element having an anode foil and a cathode foil, wound through a separator having internal voids continuous on a surface thereof, said internal voids being present in one or both of inside said separator and between said anode foil, said cathode foil, and said separator (c) removing said capacitor element impregnated with said mixed solution from said mixed solution, and (d) heating said capacitor element impregnated with said mixed solution to evaporate said solvent and form a conductive polymer layer on said capacitor element by a chemical polymerization reaction of said polymerizable monomer and said oxidant, said heating being carried out at a temperature above the boiling point of the solvent at a rate capable of generating a force able to tear open said conductive polymer formed to cover said internal voids by an evaporated solvent generated by heating said solvent contained in said internal voids.

10. A method of manufacturing a capacitor having a conductive polymer layer on a capacitor element, said method comprising:

cooling (1) a polymerizable monomer solution comprising a polymerizable monomer and a solvent and (2) an oxidant solution containing oxidant and said solvent, preparing a mixed solution by mixing said cooled polymerizable monomer solution and said cooled oxidant solution, preparing a capacitor element by forming a dielectric layer on a sintered metal, said capacitor element having internal voids continuous on a surface thereof, impregnating said capacitor element with said mixed solution, and heating said capacitor element containing said mixed solution at a temperature greater than the boiling point of said solvent to form a conductive polymer layer to said capacitor element by a chemical polymerization reaction between said polymerizable monomer and said oxidant, said heating being carried out at a temperature above the boiling point of the solvent at a rate capable of generating a force able to tear open said conductive polymer layer formed to cover said internal voids by an evaporated solvent generated by heating said solvent contained in said internal voids.

11. The method of claim 10, wherein said dielectric layer is an oxide film of a valve metal.

12. A method of manufacturing a capacitor having a conductive polymer layer on a capacitor element, said method comprising:

cooling (1) a polymerizable monomer solution comprising a polymerizable monomer and a solvent and (2) an oxidant solution containing oxidant and said solvent, preparing a mixed solution by mixing said cooled polymerizable monomer solution and said cooled oxidant solution, preparing a capacitor element having an anode foil having a dielectric layer formed thereon and a cathode foil wound through a separator, said capacitor element having internal voids continuous on a surface thereof, impregnating said capacitor element with said cooled mixed solution, and heating said capacitor element containing said cooled mixed solution at a temperature greater than the boiling point of said solvent to form a conductive polymer layer to said capacitor element by a chemical polymerization reaction between said polymerizable monomer and said oxidant, said heating being carried out at a temperature above the boiling point of the solvent at a rate capable of generating a force able to tear open said conductive polymer layer formed to cover said internal voids by an evaporated solvent generated by heating said solvent contained in said internal voids.

13. The method of claim 12, wherein said dielectric layer is an oxide film of a valve metal.

14. The method of claim 12, wherein said dielectric layer is a polymer film.

15. A method of manufacturing a capacitor having a conductive polymer layer on a capacitor element, said method comprising:

cooling (1) a polymerizable monomer solution comprising a polymerizable monomer and solvent and (2) an oxidant solution containing oxidant and said solvent, preparing a mixed solution by mixing said cooled polymerizable monomer solution and said cooled oxidant solution, preparing a capacitor element having an anode foil having a dielectric layer formed thereon and a cathode foil wound through a separator, said capacitor element having internal voids continuous on a surface thereof, impregnating said capacitor element with said cooled mixed solution, heating said capacitor element containing said cooled mixed solution at a temperature greater than the boiling point of said solvent to form a conductive polymer layer to said capacitor element by a chemical polymerization reaction between said polymerizable monomer and said oxidant, said heating being carried out at a temperature above the boiling point of the solvent at a rate capable of generating a force able to tear open said conductive polymer layer formed in said capacitor element by chemical polymerization reaction between said polymerizable monomer and said oxidant to cover said internal voids by an evaporated solvent generated by heating said solvent contained in said internal voids, and impregnating said conductive polymer layer with an electrolyte.

* * * * *